US007773669B2

(12) United States Patent
Degani et al.

(10) Patent No.: US 7,773,669 B2
(45) Date of Patent: Aug. 10, 2010

(54) CASCADED PHASE PULSE POSITION AND PULSE WIDTH MODULATION BASED DIGITAL TRANSMITTER

(75) Inventors: Ofir Degani, Haifa (IL); Hasnain Lakdawala, Beaverton, OR (US); Ashoke Ravi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 535 days.

(21) Appl. No.: 11/837,043

(22) Filed: Aug. 10, 2007

(65) Prior Publication Data

US 2009/0041108 A1 Feb. 12, 2009

(51) Int. Cl.
*H03K 7/04* (2006.01)
(52) U.S. Cl. ...................... 375/239; 375/238
(58) Field of Classification Search .......... 375/238, 375/239; 370/211, 212; 332/106–116
See application file for complete search history.

(56) References Cited

U.S. PATENT DOCUMENTS

| | | | |
|---|---|---|---|
| 6,041,074 A | 3/2000 | Nakamura | |
| 6,201,452 B1 * | 3/2001 | Dent et al. | 332/103 |
| 6,970,496 B1 | 11/2005 | Ben-Bassat et al. | |
| 6,993,087 B2 | 1/2006 | Rosnell et al. | |
| 7,230,837 B1 | 6/2007 | Huang et al. | |
| 2005/0152703 A1 | 7/2005 | Ogawa | |

OTHER PUBLICATIONS

International Search Report PCT/US2008/072516, mailed Nov. 27, 2008, 9 Pages.
PCT/US2008/072516, Notification Concerning Transmittal International Preliminary Report on Patentability, Feb. 25, 2010, 6 pages.

* cited by examiner

*Primary Examiner*—Kevin Y Kim
(74) *Attorney, Agent, or Firm*—Cool Patent, P.C.; Joseph P. Curtin

(57) ABSTRACT

Briefly, in accordance with one or more embodiments, a digital transmitter may comprise two or more phase modulators in a cascaded arrangement. The phase modulators may modulate a local oscillator signal using control signals derived from the quadrature baseband data to be transmitted. A closed loop power control feedback arrangement may be used to compare the output power of the transmitter with a desired output signal, and make corrections to the output signal by modifying at least one of the control signals provided to the cascaded phase modulators.

30 Claims, 7 Drawing Sheets

CASCADED PHASE PULSE POSITION AND PULSE WIDTH MODULATION BASED DIGITAL TRANSMITTER

BACKGROUND

Orthogonal frequency division multiplexing (OFDM) has become the modulation of choice for higher data rate wireless communication links for personal area networks (PAN), local area networks (LAN) and metropolitan area networks (MAN) networks. OFDM waveforms have both amplitude and phase information requiring linear amplifiers generally having lower efficiency in the transmitter power amplifier (PA). The significant peak to average power ratios, typically 10 dB to 15 dB, further reduces the average efficiency of such OFDM transmitters. Power control on mobile units may further result in an average transmit power that is typically 30 dB to 50 dB lower than the peak power, and a corresponding reduction in efficiency. In mobile and handheld applications, such lower power efficiency in transmit mode may severely affect reliability, for example due to thermal issues, as well as limiting battery life of the hand-held device. Switching power amplifiers, commonly utilized with pure frequency/phase modulation schemes, are capable of achieving a higher efficiency; however the application of switching power amplifiers to OFDM systems is not straightforward.

Furthermore, conventional radio transmitters comprise analog circuits which are sensitive to process, voltage and/or temperature, typically utilize inductors that occupy a larger die area, and/or that are not compatible with scaled lower voltage complementary metal-oxide semiconductor (CMOS) processes, such as headroom/linearity, gain and/or matching constraints. The increasing speed of the lower-voltage transistor can be exploited to replace lower-speed, higher-resolution analog circuits with higher-speed, lower-resolution circuits.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 6:
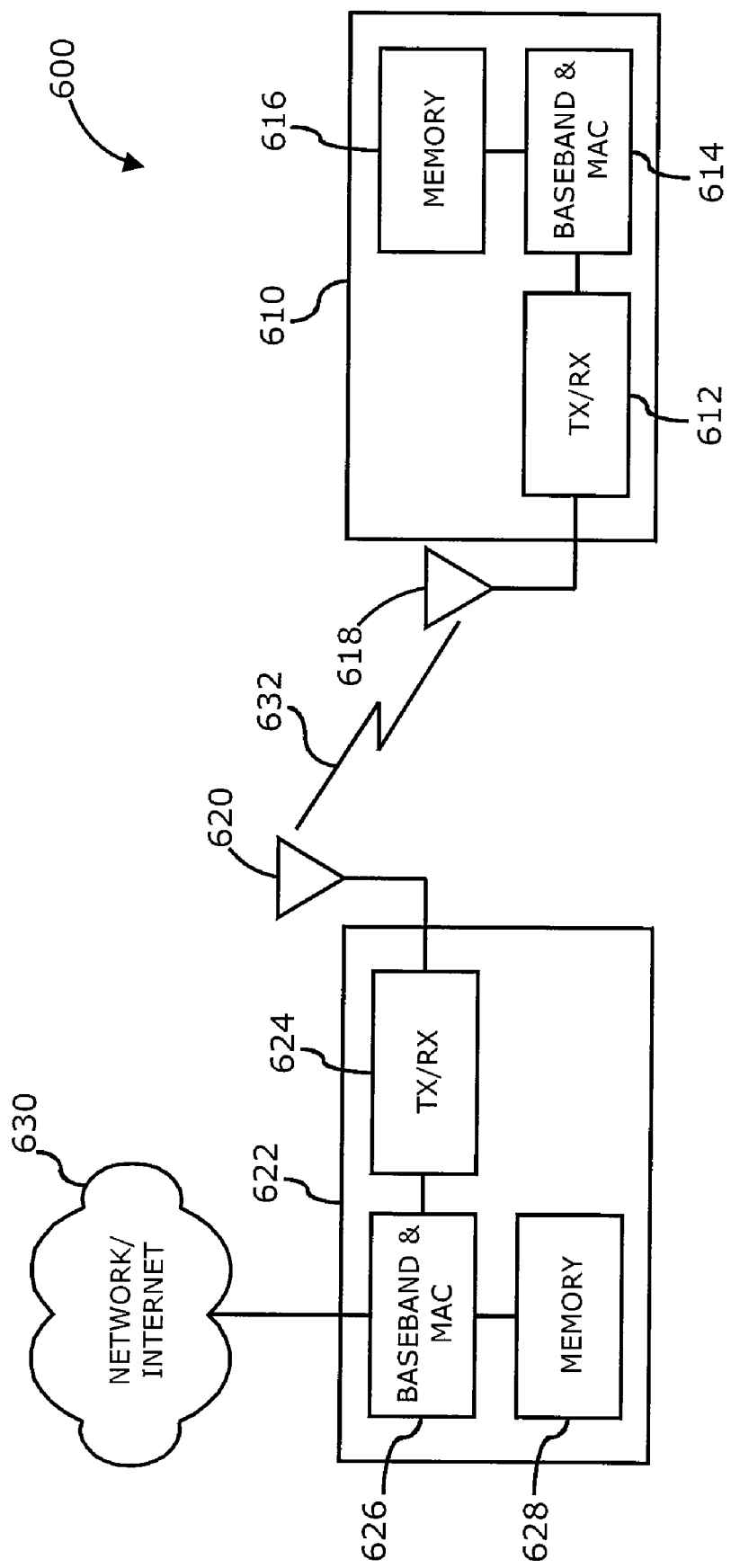
Figure 7:
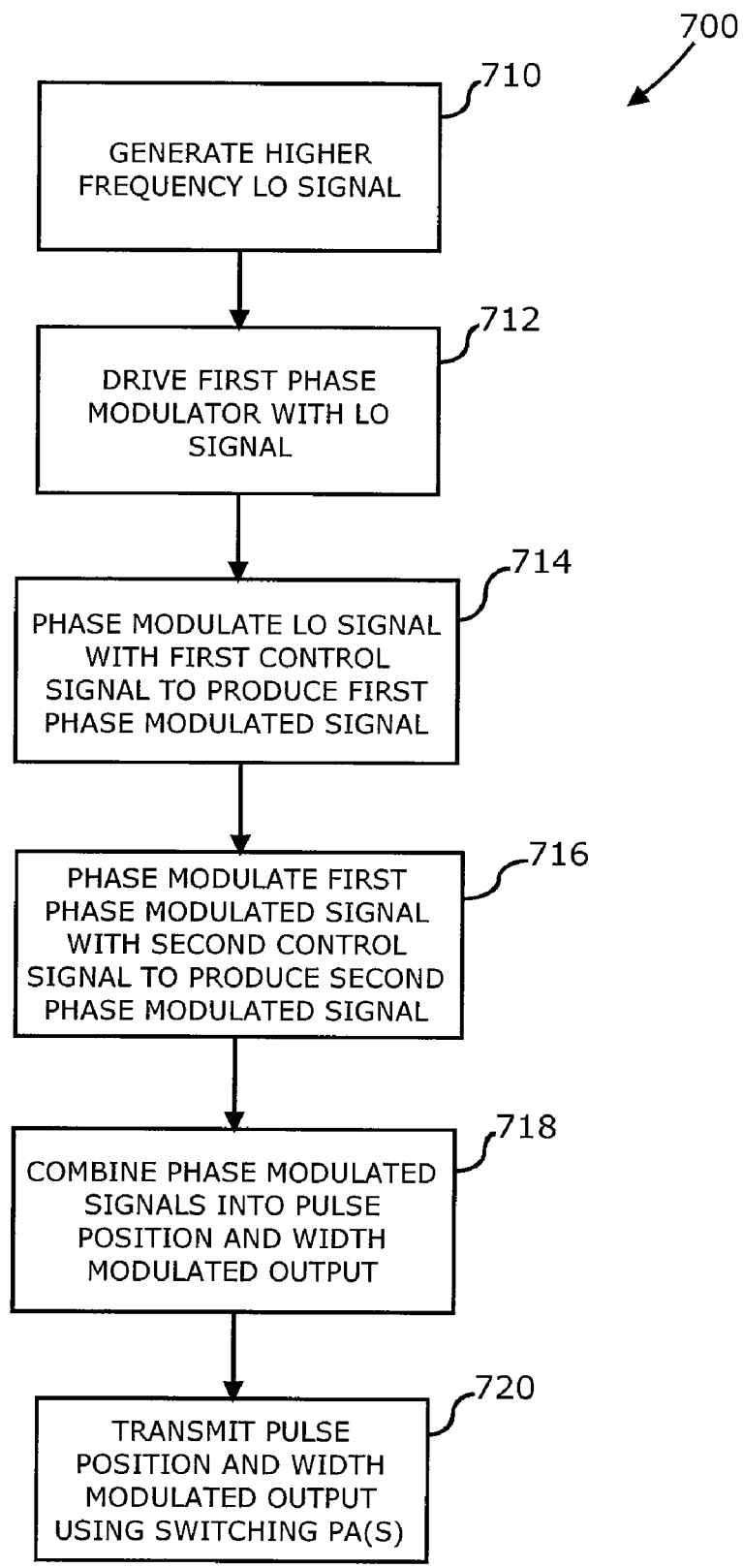

FIG. 6 is a block diagram of a wireless local area or cellular network communication system showing one or more network devices capable of utilizing a cascaded phase pulse position and pulse width modulation based digital transmitter in accordance with one or more embodiments; and FIG. 7 is a flow diagram of a method for providing a pulse position and pulse width modulated signal based on a cascaded phase modulation in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
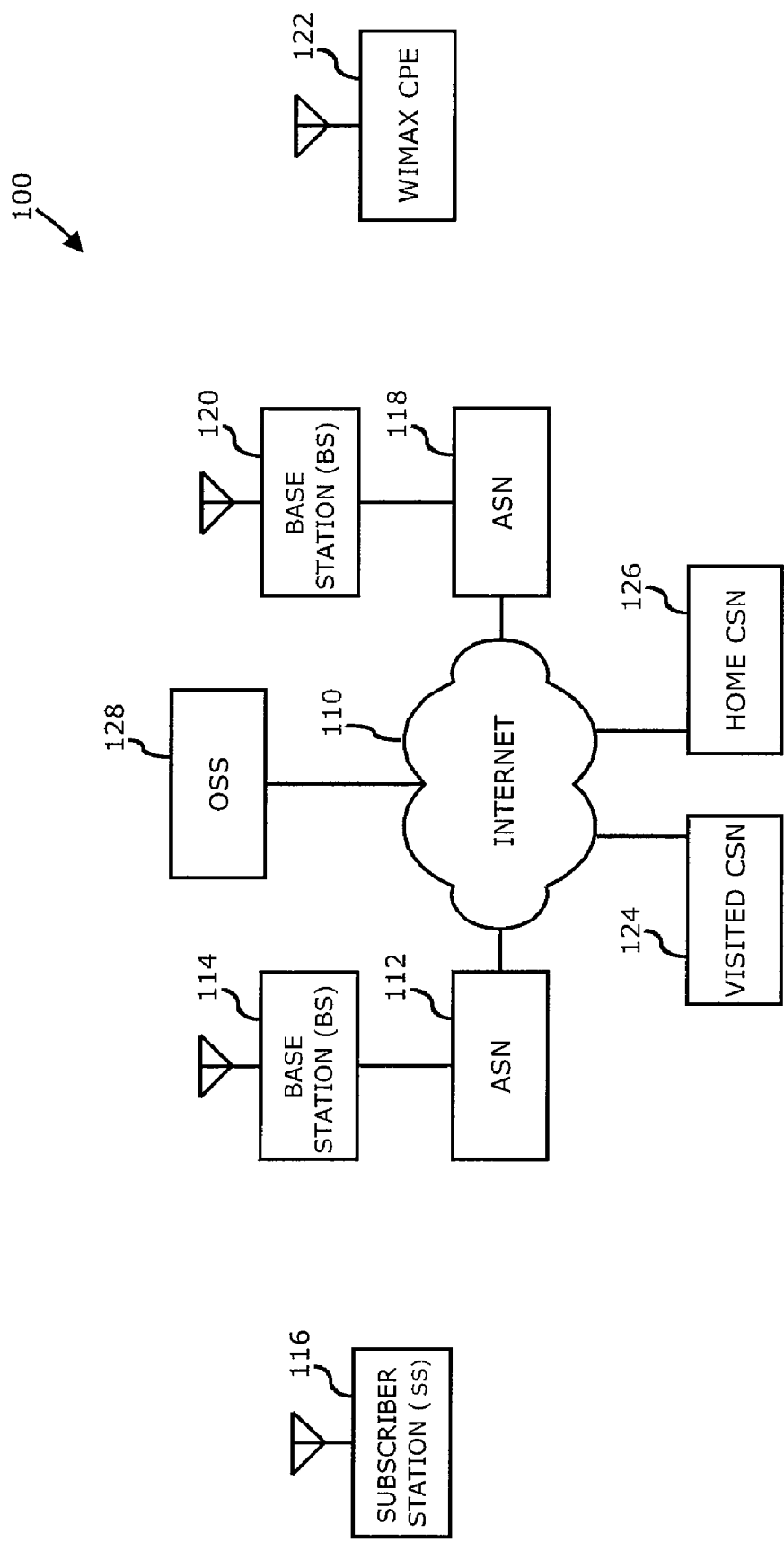
FIG. 1 is a block diagram of a wireless network capable of utilizing a cascaded phase pulse position and pulse width modulation based digital transmitter in accordance with one or more embodiments.

Referring now to FIG. 1, a block diagram of a wireless network capable of utilizing a cascaded phase pulse position and pulse width modulation based digital transmitter in accordance with one or more embodiments will be discussed. In one or more embodiments, any one or more of base station 114, subscriber station 116, base station 122, and/or WiMAX customer premises equipment (CPE) 122 may utilize the transmitter 200 of FIG. 2, transmitter 300 of FIG. 3, or transmitter 400 of FIG. 4, below, although the scope of the claimed subject matter is not limited in this respect. As shown in FIG. 1, network 100 may be an Internet Protocol (IP) type network comprising an Internet 110 type network, or the like, that is capable of supporting mobile wireless access and/or fixed wireless access to Internet 110. In one or more embodiments, network 100 may be in compliance with a Worldwide Interoperability for Microwave Access (WiMAX) standard or future generations of WiMAX, and in one particular embodiment may be in compliance with an Institute for Electrical and Electronics Engineers 802.16e standard (IEEE 802.16e). In one or more alternative embodiments network 100 may be in compliance with a Third Generation Partnership Project Long Term Evolution (3GPP LTE) or a 3GPP2 Air Interface Evolution (3GPP2 AIE) standard. In general, network 100 may comprise any type of orthogonal frequency division multiple access (OFDMA) based wireless network, although the scope of the claimed subject matter is not limited in these respects. As an example of mobile wireless access, access service network (ASN) 112 is capable of coupling with base station (BS) 114 to provide wireless communication between subscriber station (SS) 116 and Internet 110. Subscriber station 116 may comprise a mobile-type device or information-handling system capable of wirelessly communicating via network 100, for example, a notebook-type computer, a cellular telephone, a personal digital assistant, or the like. ASN 112 may implement profiles that are capable of defining the mapping of network functions to one or more physical entities on network 100. Base station 114 may comprise radio equipment to provide radiofrequency (RF) communication with subscriber station 116, and may comprise, for example, the physical layer (PHY) and media access control (MAC) layer equipment in compliance with an IEEE 802.16e type standard. Base station 114 may further comprise an IP backplane to couple to Internet 110 via ASN 112, although the scope of the claimed subject matter is not limited in these respects.

Network 100 may further comprise a visited connectivity service network (CSN) 124 capable of providing one or more network functions including, but not limited to, prosy- and/or relay-type functions, for example, authentication, authorization and accounting (AAA) functions, dynamic host configuration protocol (DHCP) functions, or domain-name service controls or the like, domain gateways, such as public switched telephone network (PSTN) gateways or Voice-Over-Internet-Protocol (VOIP) gateways, and/or Internet Protocol (IP) type server functions, or the like. However, these are merely example of the types of functions that are capable of being provided by visited CSN or home CSN 126, and the scope of the claimed subject matter is not limited in these respects. Visited CSN 124 may be referred to as a visited CSN in the case for example in which visited CSN 124 is not part of the regular service provider of subscriber station 116, for example, in which subscriber station 116 is roaming away from its home CSN such as home CSN 126, or, for example, in which network 100 is part of the regular service provider of subscriber station, but in which network 100 may be in another location or state that is not the main or home location of subscriber station 116. In a fixed wireless arrangement, WiMAX-type customer premises equipment (CPE) 122 may be located in a home or business to provide home or business customer broadband access to Internet 110 via base station 120, ASN 118, and home CSN 126 in a manner similar to access by subscriber station 116 via base station 114, ASN 112, and visited CSN 124, a difference being that WiMAX CPE 122 is generally disposed in a stationary location, although it may be moved to different locations as needed, whereas subscriber station may be utilized at one or more locations if subscriber station 116 is within range of base station 114, for example. In accordance with one or more embodiments, operation support system (OSS) 128 may be part of network 100 to provide management functions for network 100 and to provide interfaces between functional entities of network 100. Network 100 of FIG. 1 is merely one type of wireless network showing a certain number of the components of network 100 that are capable of utilizing a cascaded phase pulse position and pulse width modulation based digital transmitter such as transmitter 200 of FIG. 2, transmitter 300 of FIG. 3, or transmitter 400 of FIG. 4, below, and the scope of the claimed subject matter is not limited in these respects.

Although network 100 as shown in FIG. 1 is a WiMAX network as an example, it should be noted that transmitter 200 of FIG. 2, transmitter 300 of FIG. 3, or transmitter 400 of FIG. 4, below, may be utilized in other types of wireless networks and/or applications utilizing wideband orthogonal frequency division multiplexing (OFDM) modulation. For example, in one or more embodiments, network 100 alternately may comprise a network in compliance with an Institute of Electrical and Electronics Engineers (IEEE) standard such as an IEEE 802.11 a/b/g/n standard, an IEEE 802.16 d/e standard, an IEEE 802.20 standard, an IEEE 802.15 standard, an Ultra-Wide Band (UWB) standard, a Third Generation Partnership Project Long Term Evolution (3GPP-LTE) standard, an Enhanced Data Rates for Global System for Mobile Communications (GSM) Evolution (EDGE) standard, a Wideband Code Division Multiple Access (WCDMA) standard, a Digital Video Broadcasting (DVB) standard, or the like, and the scope of the claimed subject matter is not limited in this respect.

Figure 2:
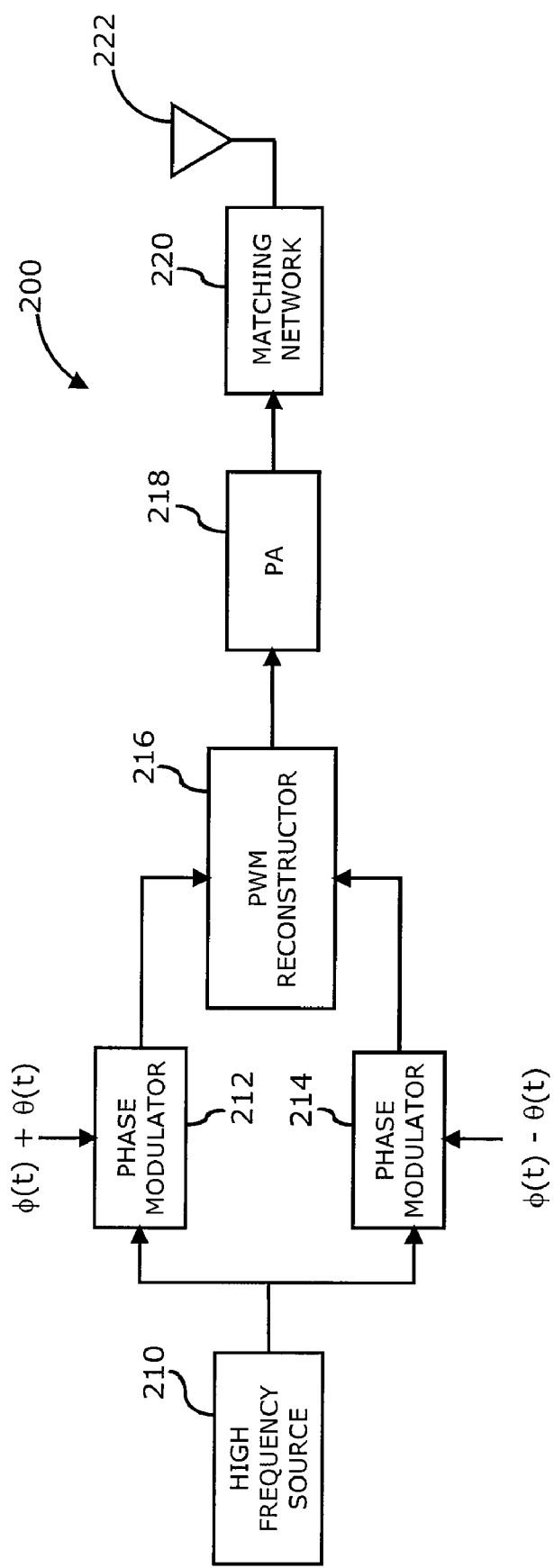
FIG. 2 is a block diagram of a pulse width pulse position modulation based digital transmitter in accordance with one or more embodiments.

Referring now to FIG. 2, a block diagram of a pulse width pulse position modulation ($P^3WM$) based digital transmitter in accordance with one or more embodiments will be discussed. In one or more embodiments, transmitter 200 comprises a higher-efficiency digital transmitter suitable for modulations with both amplitude and phase information, such as OFDM. Transmitter 200 comprises a digital-transmitter architecture employing a parallel-path phase decomposition of a general amplitude and phase modulated signal, also referred generally as a Chereix-type architecture. As shown in FIG. 2, the phase modulation is introduced by a pair of time-varying control signals, $\phi-\theta$ and $\phi+\theta$, in accordance with the Chereix original outphasing scheme per the following equations:

Desired RF signal:

$$y°(t)=I(t)\cdot\cos(\omega t)+Q(t)\cdot\sin(\omega t)$$

Reconstructed RF signal:

$$Y°(t)=s_1(t)+s_2(t)$$

in which the two-component phase-modulated signals are given by:

constant amp $\Phi-M$ components:

$$s_1(t)=A\cdot\cos(\omega t+\phi+\theta)$$

$$s_2(t)=A\cdot\cos(\omega t+\phi-\theta)$$

With standard trigonometric manipulation, it can be shown that:

$$\theta(t) = \cos^{-1}\left(\frac{\sqrt{I^2(t)+Q^2(t)}}{2A}\right)$$

$$\phi(t) = \tan^{-1}\left(\frac{Q(t)}{I(t)}\right)$$

In one or more embodiments, high-frequency source 210 generates local oscillator (LO) signals that are provided to the inputs of phase modulator 212 and phase modulator 214 to implement parallel phase modulation of the LO signals. Modulation may occur via application of control signal $\phi+\theta$ to phase modulator 212 in a first path and control signal $\phi-\theta$ to phase modulator 214 in a second path. In one or more embodiments, φ controls the phase of the signal and θ controls the amplitude of the signal, although the scope of the claimed subject matter is not limited in this respect. Any mismatches between the paths can be calibrated out digitally through corrections to control signals φ−θ and/or φ+θ via a processor (not shown). The phase-modulated outputs of phase modulators 212 and 214 may be combined via a combiner, such as pulse-width modulation (PWM) reconstructor 216, to provide a pulse position and pulse width modulated signal to power amplifier (PA) 218 for amplification and transmission as an OFDM signal. In one or more embodiments, the output of reconstructor 216 may comprise a differential signal, and power amplifier 218 may comprise a differential amplifier. In one or more embodiments, power amplifier 218 may comprise one or more switched amplifiers coupled to antenna 222 via impedance matching network (matcher) 220, although the scope of the claimed subject matter is not limited in these respects.

In one or more embodiments, reconstructor 216 may be implemented using one or more logic gates such as exclusive OR (XOR) gates and one or more digital-to-analog converters (DACs). One or more of phase modulators 212 and 214 may be implemented using any one or more of the following, but are not limited to, an open-loop delay line, a closed-loop delay line and a delay-locked loop (DLL), a delay-locked loop controlled by a digital-to-analog converter, a delay line with sigma-delta phase selection in open loop or embedded in a delay-locked loop, an integer-n phase-locked loop (PLL), a fractional-n phase-locked loop, an offset loop phase-locked loop, a reference modulated phase-locked loop, and/or via direct-digital synthesis. However, these are merely example implementations of phase modulators 212 and 214, and the scope of the claimed subject matter is not limited in these respects.

Figure 3:
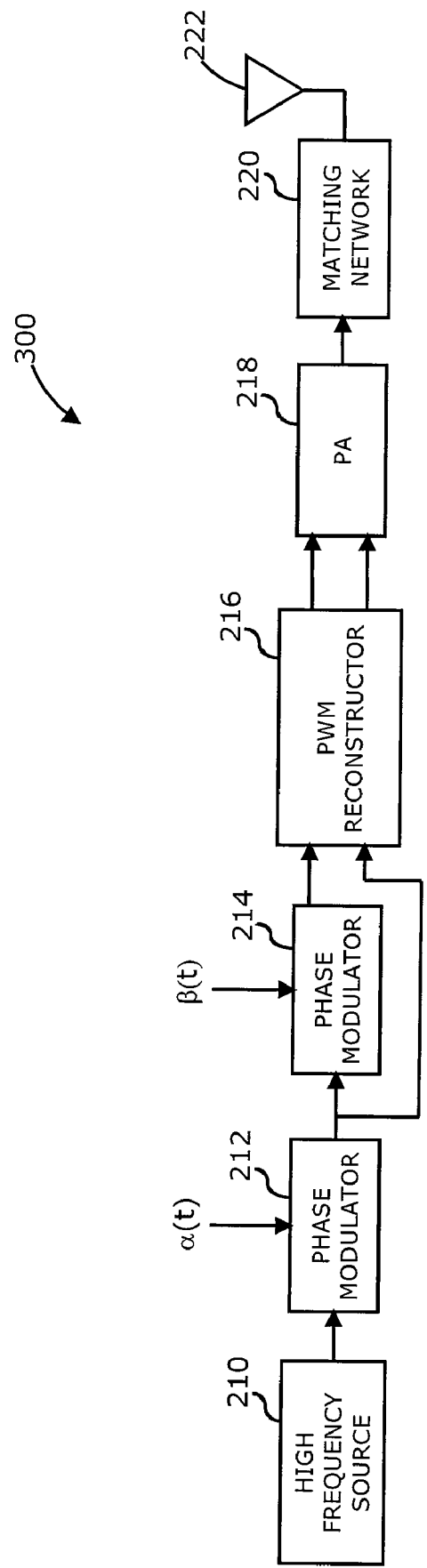
FIG. 3 is a block diagram of a cascaded phase pulse width pulse position modulation based digital transmitter in accordance with one or more embodiments.

Referring now to FIG. 3, a block diagram of a cascaded phase pulse width and pulse position modulation based digital transmitter in accordance with one or more embodiments will be discussed. Transmitter 300 of FIG. 3 is similar to transmitter 200 of FIG. 2, however phase modulators 212 and 214 are disposed in a cascade arrangement in FIG. 3 versus the parallel arrangement shown in FIG. 2. As a result, the control signals applied to phase modulators 212 and 214 are transformed into a different decomposition to achieve the desired phase-modulated output signals. Thus, in one or more embodiments the control signals based on φ and θ from the equations, above, for the parallel arrangement may be transformed into a cascaded arrangement as follows:

$$\alpha = \phi - \theta$$

$$\beta = 2\theta$$

As shown in FIG. 3, control signal α may be provided to the first cascaded phase modulator, which is phase modulator 212, and control signal β may be provided to the second cascaded phase modulator, which is phase modulator 214. In such a cascaded arrangement of the phase modulators, the output of phase modulator 212 is provided to the input phase modulator 214. The outputs of phase modulators 212 and 214 are both provided to the input of reconstructor 216, which is shown in FIG. 3 as having differential inputs and outputs. By redefining the angles of the control signals for transmitter 300 of FIG. 3, PWM reconstructor 216 is capable of producing a pulse position and pulse width modulated output for transmission as an OFDM signal. In one or more embodiments, 2θ is being added to one path, and φ−θ is being added to the other path. In one or more alternative embodiments, a common modulator is used for φ, and +θ may be added to one path, and −θ may be added to the other path following the φ modulator. Transmitter 300 of FIG. 3 may be considered as operating in open-loop mode since there is no feedback control of the output power from the output of the one or more power amplifiers 218, although the scope of the claimed subject matter is not limited in this respect.

Figure 4:
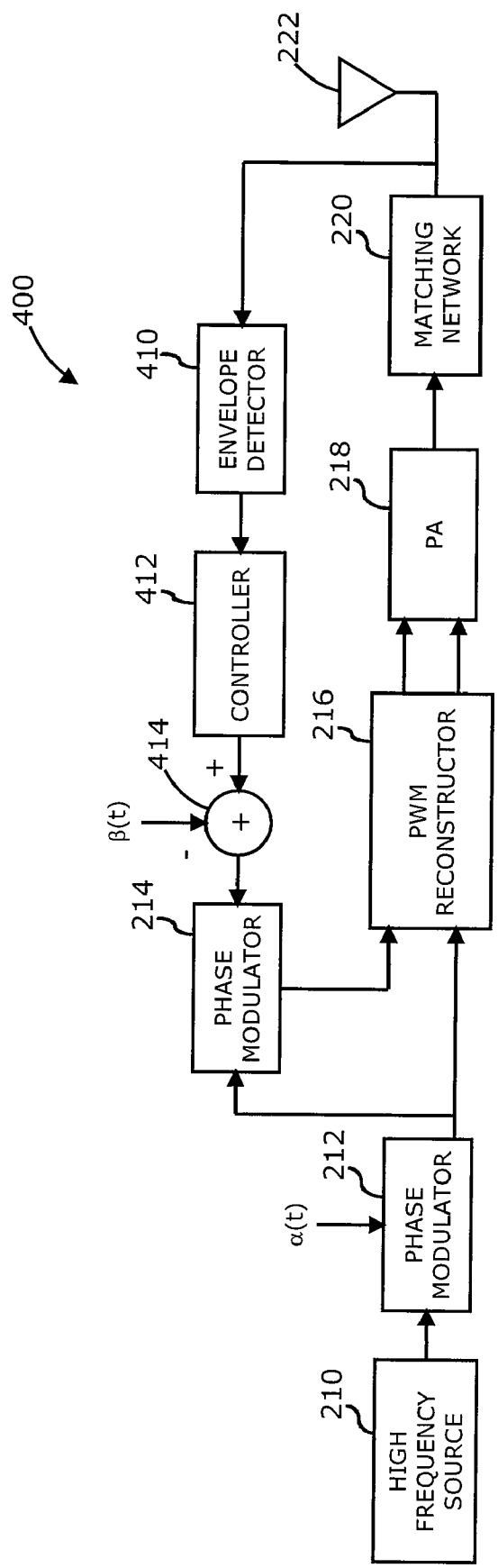
FIG. 4 is a block diagram of a cascaded phase pulse width pulse position modulation based digital transmitter having closed loop power control in accordance with one or more embodiments.

Referring now to FIG. 4, a block diagram of a cascaded phase pulse width pulse position modulation based digital transmitter having closed-loop power control in accordance with one or more embodiments will be discussed. In one or more embodiments, transmitter 400 is substantially the same as transmitter 300 of FIG. 3 with the addition of a closed-loop power control feedback arrangement. As shown in FIG. 4, phase modulator 212 receives control signal α, and phase modulator receives control signal β via the feedback loop. The output of matching network 220 is fed back to phase modulator 214 via envelope detector 410, that detects the modulation amplitude, and controller 412, which is capable of providing a control signal to phase modulator 214 in combination with input signal β via summing element 414. In such an arrangement, controller 412 may monitor the actual envelope of the output signal of transmitter 400 and compare the envelope of the output signal with the envelope of a desired output signal. In the event there is a difference and correction of the output signal is needed, controller 412 modifies the control signal provided to modulator 214 until the output signal matches, or sufficiently matches, the desired output signal. In one or more embodiments, phase modulator 214 may comprise a voltage-controlled delay line (VCDL), although the scope of the claimed subject matter is not limited in this respect.

Figure 5:
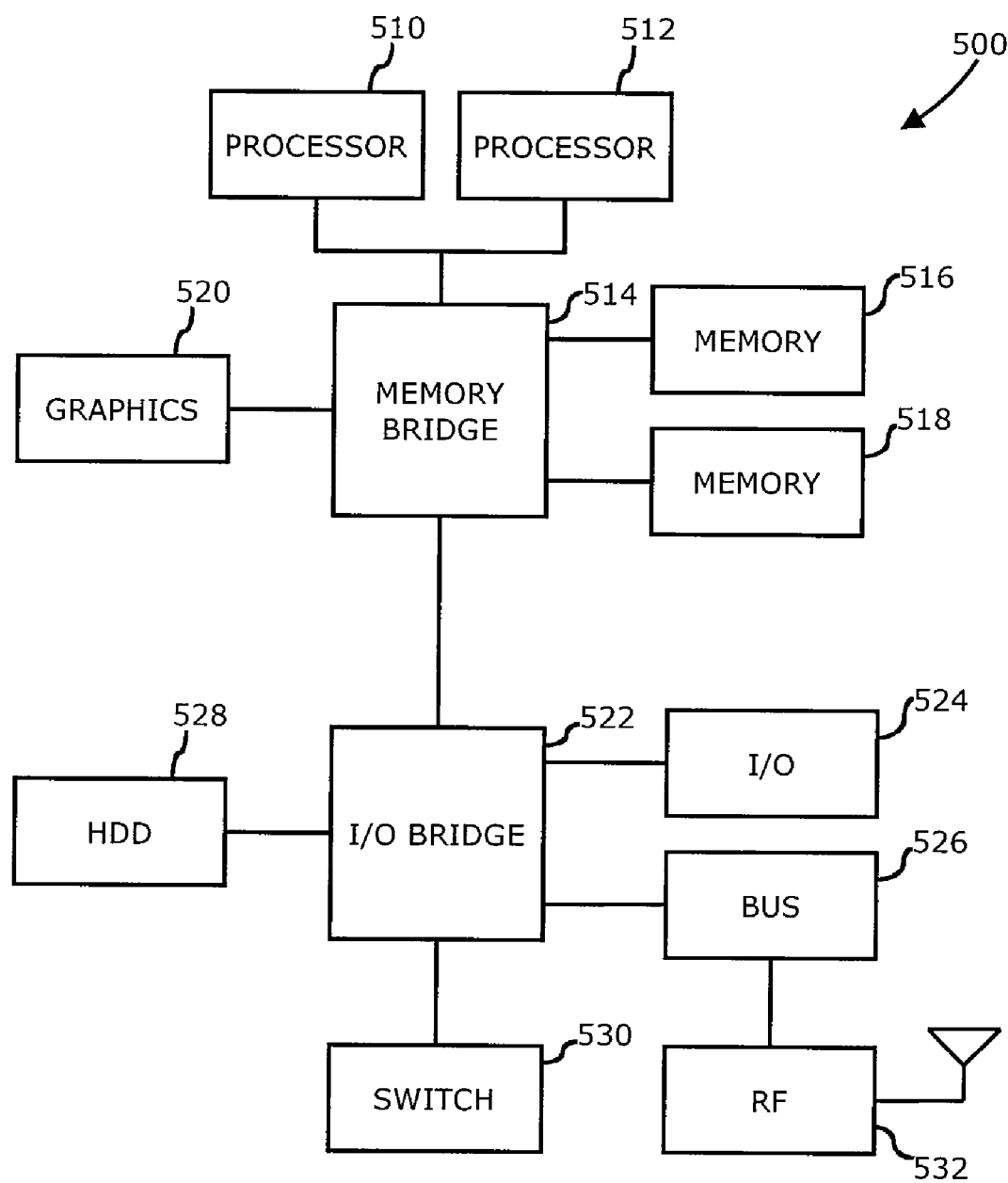
FIG. 5 is a block diagram of an information handling system capable of utilizing a cascaded phase pulse position and pulse width modulation based digital transmitter in accordance with one or more embodiments.

Referring now to FIG. 5, a block diagram of an information-handling system capable of utilizing a cascaded phase pulse position and pulse width modulation based digital transmitter in accordance with one or more embodiments. Information-handling system 500 of FIG. 5 may tangibly embody one or more of any of the network elements of network 100 as shown in and described with respect to FIG. 1. For example, information-handling system 500 may represent the hardware of base station 114 and/or subscriber station 116, with greater or fewer components depending on the hardware specifications of the particular device or network element. Although information-handling system 500 represents one example of several types of computing platforms, information-handling system 500 may include more or fewer elements and/or different arrangements of elements than shown in FIG. 5, and the scope of the claimed subject matter is not limited in these respects.

Information-handling system 500 may comprise one or more processors, such as processor 510 and/or processor 512, which may comprise one or more processing cores. One or more of processor 510 and/or processor 512 may couple to one or more memories 516 and/or 518 via memory bridge 514, which may be disposed external to processors 510 and/or 512, or alternatively at least partially disposed within one or more of processors 510 and/or 512. Memory 516 and/or memory 518 may comprise various types of semiconductor-based memory, for example, volatile-type memory and/or non-volatile-type memory. Memory bridge 514 may couple to a graphics system 520 to drive a display device (not shown) coupled to information-handling system 500.

Information-handling system 500 may further comprise input/output (I/O) bridge 522 to couple to various types of I/O systems. I/O system 524 may comprise, for example, a universal serial bus (USB) type system, an IEEE 1394 type system, or the like, to couple one or more peripheral devices to information-handling system 500. Bus system 526 may comprise one or more bus systems, such as a peripheral component interconnect (PCI) express type bus or the like, to connect one or more peripheral devices to information-handling system 500. A hard disk drive (HDD) controller system 528 may couple one or more hard disk drives or the like to information-handling system, for example Serial ATA type drives or the like, or alternatively a semiconductor-based based drive comprising flash memory, phase change, and/or chalcogenide-type memory or the like. Switch 530 may be utilized to couple one or more switched devices to I/O bridge 522, for example, Gigabit Ethernet type devices or the like. Furthermore, as shown in FIG. 5, information-handling system 500 may include a radio-frequency (RF) block 532 comprising RF circuits and devices for wireless communication with other wireless communication devices and/or via wireless networks, such as network 100 of FIG. 1, for example, in which information-handling system 500 embodies base station 114 and/or subscriber station 116, although the scope of the claimed subject matter is not limited in this respect. In one or more embodiments, RF block 532 may comprise transmitter 200 of FIG. 2, transmitter 300 of FIG. 3, and transmitter 400 of FIG. 4, at least in part. Furthermore, at least some portion of transmitter 200, transmitter 300, or transmitter 400 may be implemented by processor 510, for example, the digital functions of transmitter 200, which may include processing of the baseband and/or quadrature signals, although the scope of the claimed subject matter is not limited in this respect.

Referring now to FIG. 6, a block diagram of a wireless local area or cellular network communication system showing one or more network devices capable of utilizing a cascaded phase pulse position and pulse width modulation based digital transmitter in accordance with one or more embodiments will be discussed. In the communication system 600 shown in FIG. 6, a mobile unit 610 may include a wireless transceiver 612 to couple to an antenna 618 and to a processor 614 to provide baseband and media access control (MAC) processing functions. Transceiver 612 may include transmitter 200 of FIG. 2, transmitter 300 of FIG. 3, or transmitter 400 of FIG. 4. In one or more embodiments, mobile unit 610 may be a cellular telephone or an information-handling system, such as a mobile personal computer or a personal digital assistant, or the like, that incorporates a cellular telephone communication module, although the scope of the claimed subject matter is not limited in this respect. Processor 614 in one embodiment may comprise a single processor, or alternatively may comprise a baseband processor and an applications processor, although the scope of the claimed subject matter is not limited in this respect. Processor 614 may couple to a memory 616, which may include volatile memory, such as dynamic random-access memory (DRAM), non-volatile memory such as flash memory, or alternatively may include other types of storage such as a hard disk drive, although the scope of the claimed subject matter is not limited in this respect. Some portion or all of memory 616 may be included on the same integrated circuit as processor 614, or alternatively some portion or all of memory 616 may be disposed on an integrated circuit or other medium, for example a hard disk drive, that is external to the integrated circuit of processor 614, although the scope of the claimed subject matter is not limited in this respect.

Mobile unit 610 may communicate with access point 622 via wireless communication link 632, in which access point 622 may include at least one antenna 620, transceiver 624, processor 626, and memory 628. In one embodiment, access point 622 may be a base station of a cellular telephone network, and in an alternative embodiment, access point 622 may be a an access point or wireless router of a wireless local or personal area network, although the scope of the claimed subject matter is not limited in this respect. In an alternative embodiment, access point 622 and optionally mobile unit 610 may include two or more antennas, for example, to provide a spatial division multiple access (SDMA) system or a multiple input, multiple output (MIMO) system, although the scope of the claimed subject matter is not limited in this respect. Access point 622 may couple with network 630 so that mobile unit 610 may communicate with network 630, including devices coupled to network 630, by communicating with access point 622 via wireless communication link 632. Network 630 may include a public network, such as a telephone network or the Internet, or alternatively network 630 may include a private network, such as an intranet, or a combination of a public and a private network, although the scope of the claimed subject matter is not limited in this respect. Communication between mobile unit 610 and access point 622 may be implemented via a wireless local area network (WLAN), for example, a network compliant with a an Institute of Electrical and Electronics Engineers (IEEE) standard such as IEEE 802.11a, IEEE 802.11b, HiperLAN-II, and so on, although the scope of the claimed subject matter is not limited in this respect. In another embodiment, communication between mobile unit 610 and access point 622 may be at least partially implemented via a cellular communication network compliant with a Third Generation Partnership Project (3GPP or 3G) standard, although the scope of the claimed subject matter is not limited in this respect. In one or more embodiments, antenna 618 may be utilized in a wireless sensor network or a mesh network, although the scope of the claimed subject matter is not limited in this respect.

Referring now to FIG. 7, a flow diagram of a method for providing a pulse position pulse width modulated signal based on a cascaded phase modulation in accordance with one or more embodiments will be discussed. Although FIG. 7 shows one particular order of the blocks of method 700, method 700 is not limited to any particular order of the blocks, and may further include more or fewer blocks than shown in FIG. 7. Furthermore, although method 700 is directed to cascaded phase modulation for a digital transmitter such as transmitter 300 of FIG. 3 or transmitter 400 of FIG. 4, other numbers of paths for phase modulation may be implemented, and the scope of the clamed subject matter is not limited in these respects.

As shown in FIG. 7, a local oscillator (LO) signal may be generated at block 710, and a first phase modulator 212 may be driven with the LO signal at block 712. The LO signal may be phase modulated at block 714 with a first control signal to produce a first phase-modulated signal, wherein the first control signal may be derived from quadrature baseband data to be transmitted. The first phase-modulated signal may be itself phase modulated at block 716 with a second control signal to produce a second phase-modulated signal, wherein the second control signal may also be derived from quadrature baseband date to be transmitted. The first and second phase-modulated signals may be combined at block 718, for example,. via pulse-width modulation (PWM) reconstructor 216 to produce a pulse position and pulse width modulated ($P^3WM$) signal to be transmitted. The pulse position and pulse width modulated output signal may be transmitted at block 720, for example via one or more switching power amplifiers 218, which in one or more embodiments may comprise switching amplifiers. In one or more embodiments, the transmitted signal may comprise an orthogonal frequency division multiplexing (OFDM) signal having a constant, or nearly constant, amplitude, although the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to a cascaded phase pulse position and pulse width modulation based digital transmitter and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus, comprising:
a frequency synthesizer to generate a local oscillator signal;
first and second phase modulators each comprising an input and an output, the first and second phase modulators coupled in a cascaded arrangement so that the output of the first phase modulator is coupled to the input of the second phase modulator, the first and second phase modulators capable of modulating the local oscillator signal with control signals derived from quadrature baseband data to be transmitted, the first and second phase modulators being capable of providing phase-modulated signals at their respective outputs; and
a combiner to combine the phase-modulated signals into a pulse position and pulse width modulated signal to be transmitted.

2. An apparatus as claimed in claim 1, wherein the pulse position and pulse width modulated signal to be transmitted comprises a signal modulated via one or more of the following modulation schemes: orthogonal frequency division multiplexing (OFDM), continuous wave (CW) modulation, amplitude-shift keying (ASK) modulation, phase-shift keying (PSK) modulation, frequency-shift keying (FSK) modulation, quadrature amplitude modulation (QAM), continuous phase modulation (CPM), trellis code modulation (TCM), or combinations thereof.

3. An apparatus as claimed in claim 1, wherein the pulse position and pulse width modulated signal to be transmitted comprises a constant, or nearly constant, amplitude.

4. An apparatus as claimed in claim 1, further comprising a power control loop to modify a control signal to at least one of the first and second phase modulators based at least in part on the signal to be transmitted.

5. An apparatus as claimed in claim 1, further comprising a power control loop to modify a control signal to at least one of the first and second phase modulators based at least in part on the signal to be transmitted, the power control loop comprising an envelope detector to set a threshold for a feedback signal, and a controller coupled to the envelope detector to modify the control signal.

6. An apparatus as claimed in claim 1, wherein at least one or more of the first and second phase modulators comprises a voltage-controlled delay line, a delay-locked loop, an open loop delay line, a closed loop delay line and a delay-locked loop, a delay-locked loop controlled by a digital-to-analog converter, a delay line with sigma-delta phase selection in open loop, or a delay line with sigma-delta phase selection in open loop embedded in a delay-locked loop, a phase-locked loop, an integer-n phase-locked loop, a fractional-n phase-locked loop, an offset loop phase-locked loop, a reference modulated phase-locked loop, or a direct digital synthesis circuit, or combinations thereof.

7. An apparatus as claimed in claim 1, wherein the first and second phase modulators operate at a lower frequency than phase modulation involving a single phase modulator.

8. An apparatus as claimed in claim 1, further comprising one or more switching power amplifiers to amplify the pulse position and pulse width modulated signal to be transmitted to a power level suitable for transmission.

9. An apparatus as claimed in claim 1, wherein the pulse position and pulse width modulated signal to be transmitted provided by the combiner comprises a differential signal.

10. An apparatus as claimed in claim 1, wherein the combiner comprises a pulse-width modulation combiner.

11. An apparatus as claimed in claim 1, wherein the combiner comprises one or more logic gates and one or more digital-to-analog converters.

12. A method, comprising:
generating a local oscillator signal;
modulating the local oscillator signal with a first control signal derived from quadrature baseband data to be transmitted to result in a first phase-modulated signal;
modulating the first phase-modulated signal with a second control signal derived from quadrature baseband data to be transmitted to result in a second phase-modulated signal; and
combining the first phase-modulated signal and the second phase-modulated signal into a pulse position and pulse width modulated signal to be transmitted.

13. A method as claimed in claim 12, wherein the pulse position and pulse width modulated signal to be transmitted comprises a signal modulated via one or more of the following modulation schemes: orthogonal frequency division multiplexing (OFDM), continuous wave (CW) modulation, amplitude-shift keying (ASK) modulation, phase-shift keying (PSK) modulation, frequency-shift keying (FSK) modulation, quadrature amplitude modulation (QAM), continuous phase modulation (CPM), trellis code modulation (TCM), or combinations thereof 14. A method as claimed in claim 12, wherein the pulse position and pulse width modulated signal to be transmitted comprises a constant, or nearly constant, amplitude.

15. A method as claimed in claim 12, said modulating the local oscillator signal or the first phase modulated signal, or combination thereof, occurs at a lower frequency than phase modulation involving a single modulation path.

16. A method as claimed in claim 12, further comprising amplifying the pulse position and pulse width modulated signal to be transmitted to a power level suitable for transmission.

17. A method as claimed in claim 12, wherein the pulse position and pulse width modulated signal to be transmitted comprises a differential signal.

18. A method as claimed in claim 12, wherein said combining comprises pulse-width modulation.

19. A method as claimed in claim 12, further comprising:
comparing the pulse position and pulse width modulated signal to be transmitted with a desired output signal; and
if correction of the pulse position and pulse width modulated signal to be transmitted is needed, correcting at least one of the first control signal or the second control signal, or combinations thereof based at least in part on said comparing.

20. An apparatus, comprising:
a baseband processor;

a transceiver coupled to the baseband processor; and an omnidirectional antenna coupled to the transceiver;

wherein the transceiver comprises:

a frequency synthesizer to generate a local oscillator signal;

first and second phase modulators each comprising an input and an output, the first and second phase modulators coupled in a cascaded arrangement so that the output of the first phase modulator is coupled to the input of the second phase modulator, the first and second phase modulators capable of modulating the local oscillator signal with control signals derived from quadrature baseband data to be transmitted, the first and second phase modulators being capable of providing phase-modulated signals at their respective outputs; and a combiner to combine the phase-modulated signals into a pulse position and pulse width modulated signal to be transmitted.

21. An apparatus as claimed in claim 20, wherein the pulse position and pulse width modulated signal to be transmitted comprises a signal modulated via one or more of the following modulation schemes: orthogonal frequency division multiplexing (OFDM), continuous wave (CW) modulation, amplitude-shift keying (ASK) modulation, phase-shift keying (PSK) modulation, frequency-shift keying (FSK) modulation, quadrature amplitude modulation (QAM), continuous phase modulation (CPM), trellis code modulation (TCM), or combinations thereof.

22. An apparatus as claimed in claim 20, wherein the pulse position and pulse width modulated signal to be transmitted comprises a constant, or nearly constant, amplitude.

23. An apparatus as claimed in claim 20, further comprising a power control loop to modify a control signal to at least one of the first and second phase modulators based at least in part on the signal to be transmitted.

24. An apparatus as claimed in claim 20, further comprising a power control loop to modify a control signal to at least one of the first and second phase modulators based at least in part on the signal to be transmitted, the power control loop comprising an envelope detector to measure the modulation amplitude as a feedback signal, and a controller coupled to the envelope detector to modify the control signal.

25. An apparatus as claimed in claim 20, wherein at least one or more of the first and second phase modulators comprises a voltage-controlled delay line, a delay-locked loop, an open loop delay line, a closed loop delay line and a delay-locked loop, a delay-locked loop controlled by a digital-to-analog converter, a delay line with sigma-delta phase selection in open loop, or a delay line with sigma-delta phase selection in open loop embedded in a delay-locked loop, a phase-locked loop, an integer-n phase-locked loop, a fractional-n phase-locked loop, an offset loop phase-locked loop, a reference modulated phase-locked loop, or a direct digital synthesis circuit, or combinations thereof.

26. An apparatus as claimed in claim 20, wherein the first and second phase modulators operate at a lower frequency than phase modulation involving a single phase modulator.

27. An apparatus as claimed in claim 20, further comprising one or more switching power amplifiers to amplify the pulse position and pulse width modulated signal to be transmitted to a power level suitable for transmission.

28. An apparatus as claimed in claim 20, wherein the pulse position and pulse width modulated signal to be transmitted provided by the combiner comprises a differential signal.

29. An apparatus as claimed in claim 20, wherein the combiner comprises a pulse-width modulation combiner.

30. An apparatus as claimed in claim 20, wherein the combiner comprises one or more logic gates and one or more digital-to-analog converters.

* * * * *